US006976392B2

(12) United States Patent
DiFoggio et al.

(10) Patent No.: US 6,976,392 B2
(45) Date of Patent: *Dec. 20, 2005

(54) ATOMIC CLOCK FOR DOWNHOLE APPLICATIONS

(75) Inventors: Rocco DiFoggio, Houston, TX (US); Peter W. Reittinger, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/992,797

(22) Filed: Nov. 19, 2004

(65) Prior Publication Data

US 2005/0122839 A1 Jun. 9, 2005

Related U.S. Application Data

(63) Continuation of application No. 10/664,664, filed on Sep. 18, 2003, now Pat. No. 6,837,105.

(51) Int. Cl.[7] ........................... G01V 1/22; G01V 1/40

(52) U.S. Cl. .............................. 73/152.46; 73/152.43; 73/152.47; 73/152.49; 175/1; 175/4; 367/86

(58) Field of Search ........................ 73/152.01–152.62; 33/3; 175/1, 40–50; 367/38, 40, 50, 81, 86

(56) References Cited

U.S. PATENT DOCUMENTS

| | | | | |
|---|---|---|---|---|
| 4,281,403 | A | 7/1981 | Siems et al. | 367/76 |
| 4,675,684 | A | 6/1987 | Spence | 342/394 |
| 5,208,539 | A | 5/1993 | Holmqvist et al. | 324/334 |
| 5,555,220 | A | 9/1996 | Minto | 367/86 |
| 5,585,556 | A | 12/1996 | Peterson et al. | 73/152.03 |
| 5,657,340 | A | 8/1997 | Camparo et al. | 372/69 |
| 5,828,751 | A | 10/1998 | Walker et al. | 713/175 |
| 6,023,444 | A | 2/2000 | Naville et al. | 367/82 |
| 6,024,344 | A | 2/2000 | Buckley et al. | 367/76 |
| 6,341,498 | B1 | 1/2002 | DiFoggio | 62/259.2 |
| 6,426,679 | B1 | 7/2002 | Oblak et al. | 331/3 |
| 6,474,254 | B1 | 11/2002 | Ambs et al. | 114/312 |
| 6,553,316 | B2 | 4/2003 | Bary et al. | 702/16 |
| 6,614,718 | B2 | 9/2003 | Cecconi et al. | 367/86 |
| 6,672,093 | B2 | 1/2004 | DiFoggio | 62/259.2 |
| 2002/0060952 | A1 | 5/2002 | Cecconi et al. | |
| 2002/0075079 | A1 | 6/2002 | Oblak et al. | |
| 2002/0125959 | A1 | 9/2002 | Atsumi et al. | |
| 2002/0175767 | A1 | 11/2002 | Kitching et al. | |
| 2003/0019234 | A1 | 1/2003 | Wayburn et al. | |
| 2003/0019235 | A1 | 1/2003 | Wall et al. | |
| 2003/0085039 | A1 | 5/2003 | DiFoggio | 166/302 |
| 2003/0185099 | A1 | 10/2003 | Jackson | 367/82 |
| 2004/0246059 | A1 * | 12/2004 | Varsamis et al. | 331/176 |

* cited by examiner

*Primary Examiner*—Hezron Williams
*Assistant Examiner*—David A. Rogers
(74) *Attorney, Agent, or Firm*—Madan, Mossman & Sriram, P.C.

(57) ABSTRACT

A system and method for acquiring seismic data are disclosed. The system comprises a controller for causing the generation of a seismic signal, where the controller has a first clock used for time-stamping a record of the generated seismic signal. A seismic receiver is deployed in a wellbore so as to detect the generated seismic signal. An atomic clock is disposed in or with the seismic receiver for time-stamping a record of the detected seismic signal. The atomic clock is synchronized with the first clock prior to being placed downhole.

35 Claims, 4 Drawing Sheets

ATOMIC CLOCK FOR DOWNHOLE APPLICATIONS

CROSS-REFERENCE TO RELATED APPLICATIONS

This application is a Continuation of U.S. patent application Ser. No. 10/664,664 filed on Sep. 18, 2003, (now U.S. Pat. No. 6,837,105) which is incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention is related to the field of geophysical exploration and more specifically to a system and method for synchronizing downhole and surface-acquired data.

2. Description of the Related Art

A seismic receiver typically is deployed in a wellbore for determining the response of the earth to seismic energy in the vicinity of the wellbore, which enables determination of certain characteristics of the earth in the vicinity of the wellbore, such as geological structure and the location of changes in the material properties of the earth which may naturally occur.

One of the reasons for using a borehole seismic receiver is for matching various depths within the earth penetrated by the wellbore to specific travel times of seismic energy generated at the earth's surface. In relatively unexplored areas, geophysical surveys are typically conducted entirely at the earth's surface. Being able to determine the time for seismic energy to travel to a particular depth within the earth using a surface seismic survey depends on a portion of the seismic energy generated at the earth's surface for the survey being reflected from a zone in the earth having an acoustic impedance mismatch. Impedance mismatches, known as reflectors, typically occur at boundaries of changes in material composition or material properties of the earth.

Reflectors are of particular interest for identifying possible exploration targets within the earth. Each reflector has associated with it a seismic travel time, determined in the surface seismic survey. In order to calculate the depth to a particular reflector, it is necessary to determine the velocity of the seismic energy through the earth. The velocity of the seismic energy through the earth is strongly related to the composition and material properties of the earth. The material properties of the earth may vary widely within different earth formations within the depth range traversed by the wellbore.

It is difficult, if not impossible, to explicitly and accurately determine the seismic velocity of formations solely from the surface seismic survey, therefore when a wellbore is drilled in a relatively unexplored area, a borehole seismic receiver is used to make measurements to determine the velocity of the seismic energy within the formations.

Determining the velocity of the formations while the wellbore is being drilled, rather than after the drilling is completed, can be particularly valuable in certain instances. For example, some wellbores are drilled directionally to the exploration target because the target is horizontally displaced from the location of the wellbore at the earth's surface. If the target was selected only on the basis of seismic travel time to a reflector, then the depth to the target may not be precisely determinable without knowing the velocity of the formations from the earth's surface to the target. This lack of knowledge could cause the planned wellbore trajectory to miss the target entirely.

Periodic use of a wellbore seismic receiver during drilling in conjunction with a seismic energy source deployed at the earth's surface directly above the position of the wellbore seismic receiver enables measurement of seismic energy travel time to the depth of the seismic receiver deployed in the wellbore. The measurement of seismic travel times to various depths enables calibration of the surface seismic survey travel time in depth, thereby increasing the probability that the wellbore will penetrate the target.

Certain reflectors observed on the surface seismic survey are of particular concern in drilling the wellbore. For example, reflectors sometimes correlate to the presence of significant changes in the gradient of fluid pressure contained within some formations. Knowledge of the precise depth of the reflector could prevent drilling problems which might result from unintended penetration of a formation containing fluid pressure with a significantly different gradient than the gradient otherwise expected. The use of a borehole seismic receiver to calibrate seismic travel time to the wellbore depth could enable more precise determination of the depth of the reflector, which could prevent unintended penetration of formations having abnormal fluid pressures.

It is also known in the art to use borehole seismic receivers for generating seismic reflection sections in an area around the wellbore. Seismic energy from the seismic energy source also travels deeper than the receiver in the wellbore and can be reflected by deeper zones having acoustic impedance mismatch, just as with a surface seismic section. The reflection energy can be identified by appropriate processing of a recording of the energy detected by the receiver. The identified reflection energy can be displayed in a form for comparing the borehole seismic survey with the surface seismic survey.

Systems and tools are known in the art for detecting and storing seismic signals downhole for retrieval and processing on the surface. U.S. Pat. No. 5,555,220 to Minto, assigned to the assignee of this application and incorporated herein by reference, describes a seismic receiver deployed to the bottom of a drill string on a slick line for taking seismic survey data. Seismic data is received and stored and the receiver is retrieved to the surface. A clock in a surface controller is synchronized with a clock in the deployed receiver. The source data is time-stamped using the surface clock. The received data is time-stamped using the downhole clock. The accuracy of the resulting seismic profile is dependent upon the accurate synchronization of the clocks. The downhole clock, in particular, is susceptible to drift caused by substantial changes in temperature found in the downhole environment. The two clocks typically require synchronization of 1–2 milliseconds or better to achieve acceptable profile accuracy.

Another such system is that described in U.S. patent application Ser. No. 10/108,402 to Jackson, assigned to the assignee of this application, and incorporated herein by reference. Jackson describes a method for deploying a seismic receiver in a drill string by dropping and/or pumping the receiver to the bottom where it is latched to the drill string. Seismic signals are received, time-stamped by a downhole clock, and stored in memory in the receiver at multiple predetermined locations during the tripping of the drill string out of the hole. The signals are retrieved at the surface and combined with surface source data that has been time-stamped by a surface clock. Again, the accuracy of the resulting profiles rely on the synchronization of the surface and downhole clocks.

Typical deployment times for the above-described tools is 12–48 hours. This fact translates into a need for clock stability better than $1\times10^{-8}$ over the deployment time. Downhole clocks commonly use piezoelectric crystal oscillators that tend to drift with temperature and age. Such clocks are also susceptible to errors caused by shock and vibration during deployment. Using the best techniques known in the art, downhole clocks rarely exceed a stability of $1\times10^{-7}$. The downhole clock drifts out of synchronization with the surface clock, causing unacceptable degradation of the output seismic profile data.

Seismic measurements may also be made with measurement while drilling (MWD) systems, also known as logging while drilling (LWD) systems. In such applications, the deployment time may be hundreds of hours, exacerbating the problem of clock drift. Several re-synchronizing techniques have been proposed, however these techniques are not always operationally acceptable and/or successful.

There is a need for a downhole clock that is resistant to operationally-induced error and drift for use in downhole systems including downhole seismic systems.

SUMMARY OF THE INVENTION

The present invention contemplates a seismic acquisition system having a downhole seismic receiver atomic clock to maintain synchronization with a surface clock.

In one embodiment of the present invention, the seismic acquisition system comprises a controller for causing the surface generation of a seismic signal, where the controller has a clock for time-stamping a record of the generated seismic signal. At least one seismic receiver is deployed in a wellbore for detecting the seismic signal. An atomic clock is disposed in the seismic receiver for time-stamping a record of the detected seismic signal. The atomic clock is synchronized with the first clock before deployment.

In another aspect of the present invention, an atomic clock for use in a downhole tool comprises a resonant chamber having a rubidium (Rb) vapor therein. A light source irradiates the Rb vapor in the resonant chamber. A photo-detector is engaged with the resonant chamber and adapted to receive light from the resonant chamber. A first thermal control device is engaged with the light source and adapted to maintain the light source at a first predetermined temperature. A second thermal control device is engaged with the resonant chamber and the photo-detector to maintain the resonant chamber and the photo-detector at a second predetermined temperature. The first and second thermal control devices may be sorption devices or other devices designed to maintain a constant temperature.

In one embodiment of a further aspect of the present invention, a method for acquiring seismic data comprises a controller causing the surface generation of a seismic signal. A first clock in the surface controller time-stamps the record of the generated seismic signal. At least one seismic receiver, equipped with an atomic clock synchronized with the first clock, is deployed in a wellbore so as to detect the generated seismic signal. The atomic clock is used to time-stamp the record of the detected seismic signal.

Examples of the more important features of the invention are broadly summarized in order that the detailed description that follows may be better understood, and in order that the contributions to the art may be appreciated. There are, of course, additional features of and alternative embodiments of the invention that will be described hereinafter and which will further form the subject of the claims appended hereto.

BRIEF DESCRIPTION OF THE DRAWINGS

For detailed understanding of the present invention, reference is made to the following detailed description of the preferred embodiment, taken in conjunction with the accompanying drawings, in which like elements have been given like numerals, wherein.

DESCRIPTION OF PREFERRED EMBODIMENTS

Figure 1:
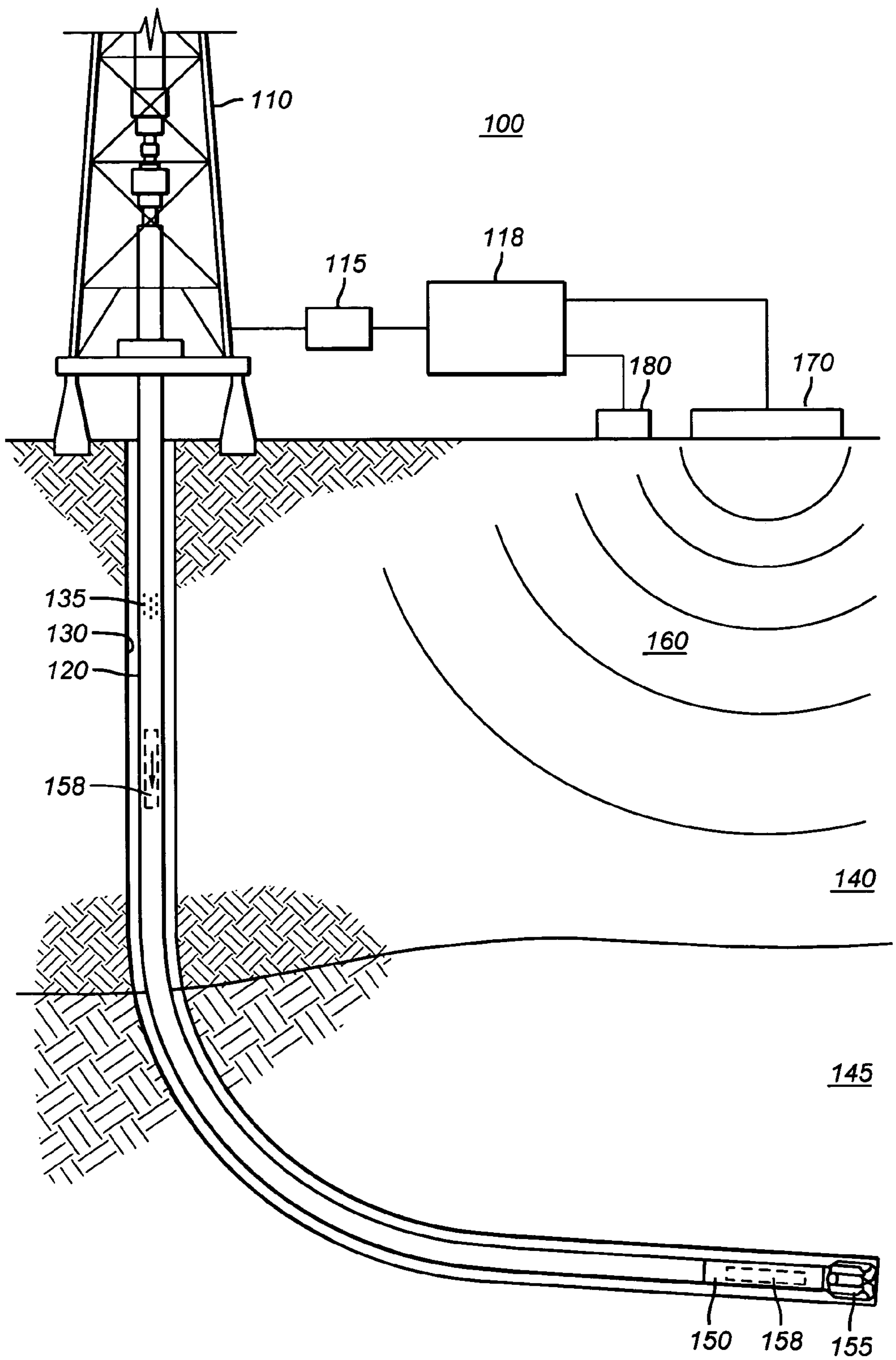
FIG. 1 is a schematic diagram of a seismic acquisition system for use in one embodiment of the present invention.

In one embodiment, referring to FIG. 1, a system 100 according to the present invention includes a derrick 110 with an attached tubular member, such as drill string 120. A drill bit 155 creates a wellbore 130 through the surrounding formation 140, which may also include formation boundaries corresponding to, for example, an over-pressurized zone 145. A seismic receiver 158, configured here in a sonde configuration, has appropriate seismic sensors and is inserted into the drill string 120. The seismic receiver 158 may fall by gravity to a landing sub 150 near the drill bit 155. Alternatively, the seismic receiver 158 may be deployed using the drilling fluid 135 to effectively pump the receiver 158 to the landing sub 150. Further alternatively, the receiver 158 may be integrated into any MWD or wireline system configuration in a manner well-known in the art.

The seismic receiver 158 receives seismic signals 160 from a seismic source 170, such as a mechanical vibrator, located at the surface. The use of a mechanical vibrator is exemplary only and not intended as a limitation on the scope of the invention. Those skilled in the art will appreciate, given the instant disclosure, that the disclosed system may be either land or marine-based and is not seismic source-type specific. For example, an offshore system could be used and may include an air gun array, either hung from an offshore platform or located near a service boat or anchored buoy. The seismic source 170 provides a suitable vertical seismic profiling-quality source signal.

Also located at the surface is a depth indicator 115 to measure the depth of the drill string 120. In embodiments where the seismic receiver 158 is deployed by wireline, the depth indicator 115 may be of the type that determines the depth of the wireline tool within the welbore. Depth indicator signals are transmitted to a surface controller 118 where they are time stamped and stored in memory.

The controller 118 is in data communication with the seismic source 170 and controls the generation of seismic signals. The controller 118 may reside at or near the location of the borehole or may be located remote from the borehole. The term "controller" as used in this disclosure and the appended claims is intended to mean any unit which provides the functions of controlling the generation of seismic signals and recording a record of their generation. In the example depicted, the controller 118 contains circuitry having processing capability, such as one or more microprocessors, as well as memory storage to allow the programming of instructions to control the generation of seismic signals. Alternatively, the memory storage may also be suitable to the storage of data representing the generated seismic signals, their character (period, amplitude, time-stamp, signature traits, near-field sensor readings, etc.) and other associated information. The controller circuitry comprises a clock, which may be referenced to provide time coding associated with the transmitted source signal. The actual connection between the controller 118 and the seismic source 170 may be a hardwire, radio frequency (RF), infrared (IR) or any other suitable communication system connection. Those skilled in the art will appreciate the many different configurations of controllers that could be used, each of which is deemed a "controller."

A near-field sensor 180 may be located near the source 170 to record the acoustic signature of the source 170. Output from sensor 180 is transmitted to the controller 118 where it is time-stamped and stored in memory. The memory used for storing data in the surface processor may be internal random access memory, magnetic storage, optical storage, or any combination of these. Alternatively, output from sensor 180 may be transmitted to the controller 118, time-stamped and forwarded via a computer communications system (not shown), such as a computer network, asynchronous connection or satellite transmission, to a remote location (not shown) for storage.

Figure 2:
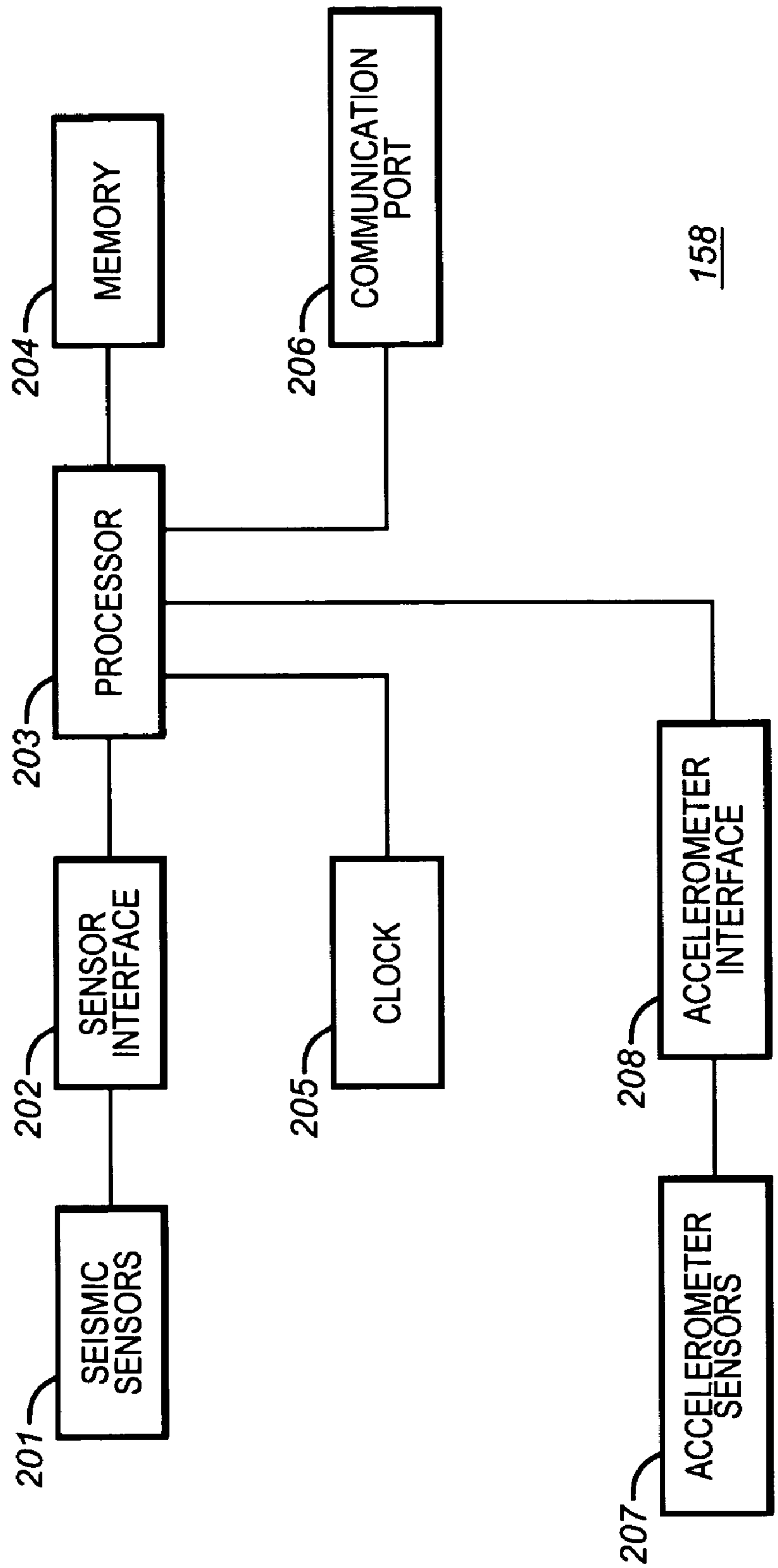
FIG. 2 is a block diagram of a seismic receiver for use in one embodiment of the present invention.

Referring to FIG. 2, the seismic receiver 158 may include a combination of sensors 201 such as hydrophones and geophones along with suitable sensor interface circuitry 202, a processor 203 and memory 204 for storage of programmed instructions and storage of received seismic data. A clock circuit 205 is also included in the receiver 158 to provide time stamps associated with the received seismic signals. The surface time clock and the receiver clock 205 are synchronized at the surface before deploying the seismic receiver 158 into the wellbore 130. A communications port 206 is included to facilitate the downloading of program instructions to memory 204 and the uploading stored seismic data (along with associated time stamps) to a surface system such as surface processor 118. Those skilled in the art will appreciate that the communications port 206 may operate by any number of means well-appreciated in the art, such as serial or parallel computer transmission, RF transmission, IR transmission or the like.

The receiver 158 may be powered by any number of means appreciated in the art, including via batteries (not shown). Sub 150 is adapted to physically latch to the landed receiver 158 to substantially prevent the receiver 158 from bouncing as the drill string 120 is tripped from the wellbore 130. It will be appreciated that in some embodiments, such as where the receiver 158 is deployed as part of a wireline tool, the sub 150 may not be required.

Clock 205 is an atomic clock, such as a rubidium clock or other clock operating on similar principles, having long-term drift several orders of magnitude lower than the typically-used crystal oscillators. Although the foregoing example is provided with reference to a rubidium clock, it will be appreciated that clocks operating based on hydrogen, cesium or other elements or molecules may be used, provided that their size can be made suitable for transport into the wellbore. It will be appreciated that the term "atomic clock" as used in this disclosure and the appended claims refers to any clock whose frequency of operation is controlled by the frequency of an atomic or molecular process.

In the rubidium atomic clock provided for purposes of demonstration, a crystal oscillator is frequency-locked to a highly-stable atomic resonance transition of a vapor such as the 6.834 GHz transition frequency of rubidium 87 ($Rb_{87}$) vapor. The vapor transition frequency is substantially insensitive to temperature, shock and vibration. Such clocks are commercially available, for example the Model X72 by Datum, Inc., Irvine, Calif. and Model AR-100A by Accu-Beat, Ltd., Jerusalem, Israel. The common core components are a resonator module containing a light source, a $Rb_{87}$-filled resonant cavity and a photo-detector. Associated drive electronics and a frequency-locked crystal oscillator drive an RF generator. In operation, the light source excites the $Rb_{87}$ atoms in the resonant cavity and the photo-detector. A frequency-locked oscillator drives the RF generator to resonate the atoms in the resonant cavity. When the RF generator is set at the 6.834 GHz transition frequency of $Rb_{87}$, the output at the photo-detector changes. The output of the photo-detector is fed back to the drive electronics to maintain the crystal oscillator frequency locked at 6.834 GHz. The crystal oscillator outputs may then be used as a stable clock signal.

In operation, the light source is maintained at about 140° C. and the resonator cavity at about 90° C. Such commercially available systems can operate at ambient temperatures up to 85° C. However, downhole ambient temperatures commonly range from 100° C. to 175° C. and can be higher than 200° C. in some cases.

Maintaining the temperatures of the clock components at the desired levels in the presence of significantly hotter external environments may require the use of various active and/or passive thermal control systems, which are commercially available and not discussed specifically as to their operation, as they are considered well-known in the art. Such control systems include, but are not limited to, (i) sorption cooling, (ii) thermoelectric cooling, (iii) thermal isolation and (iv) phase change cooling systems. Some of the cooling methods available are application-dependent. For example, a battery-operated receiver system may have insufficient power available to use thermoelectric cooling due to the inefficiency of such coolers. Some MWD systems, however, incorporate a downhole generator that may provide sufficient power to use a thermoelectric cooler.

Figure 3:
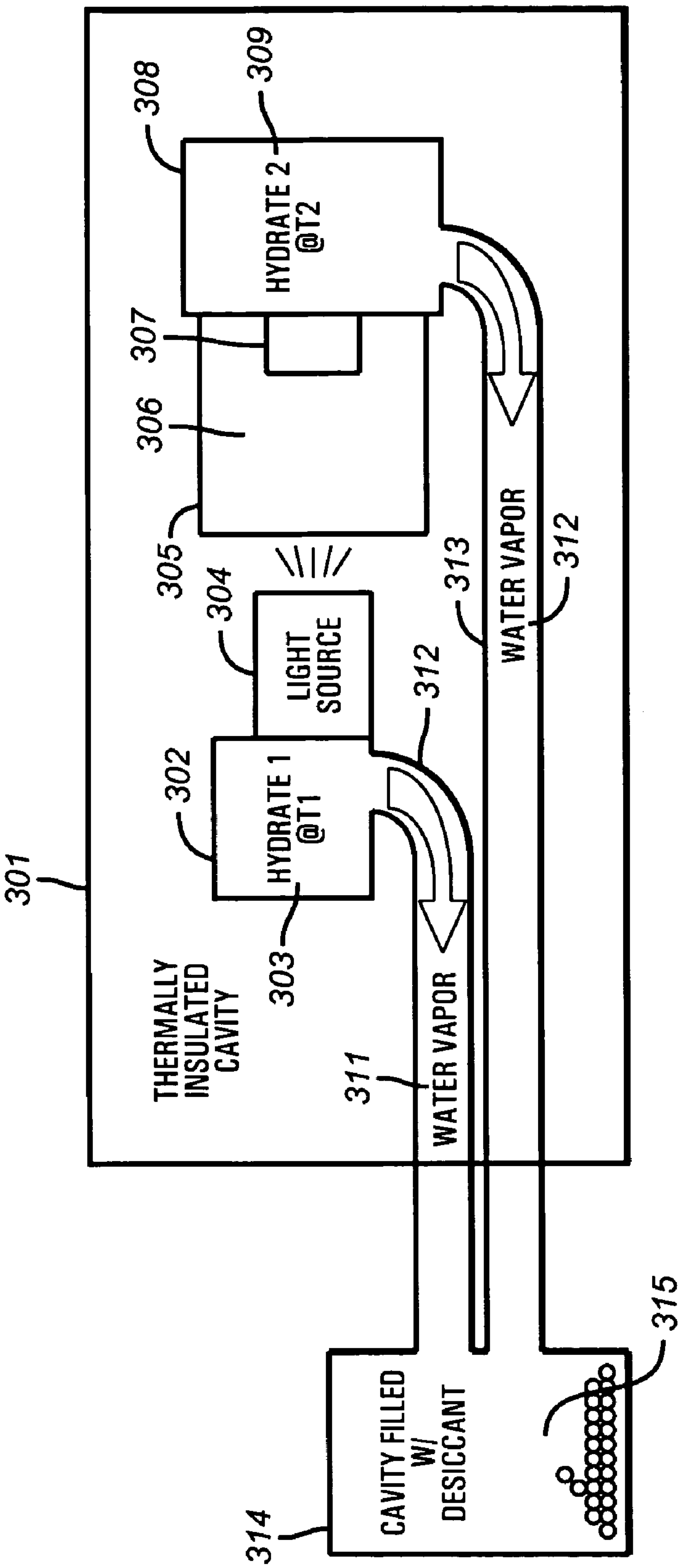
FIG. 3 is a schematic of a downhole atomic clock system for use in one embodiment of the present invention.

In an embodiment having a battery-powered receiver, such as receiver 158 (see FIG. 1), the atomic clock components are packaged so that they may be cooled using sorption cooling techniques, as is shown with reference to FIG. 3. A thermally-insulated chamber 301 contains the light source 304 adapted to illuminate $Rb_{87}$ vapor 306 in resonant chamber 305. The photo-detector 307 detects the light in the chamber 305 as previously described. The frequency-locked crystal oscillator (not shown) and related electronics may be housed in the insulated chamber or at some other location in the downhole tool. The light source 304 is thermally connected to a heat sink 302 that contains a first hydrate material 303. The resonant chamber 305 and photo-detector 307 are likewise thermally connected to heat sink 308 that contains a second hydrate material 309. Energy transferred to the hydrate materials 303 and 309 at the phase transition temperature of the hydrate will liberate water from the hydrate, absorbing a predetermined amount of energy in lieu of raising the temperature of the respective hydrate 303, 309 and heat sink 302, 308. The water vapor released is transmitted via conduits 311 and 313 to a sorption chamber 314 having a desiccant 315 suitable for absorbing the water vapor. The sorption chamber 314 is located outside of the chamber 301.

Using such a system, the temperature of each heat sink 302, 308, and thus the critical components, can be maintained at suitable predetermined temperatures $T_1$, $T_2$ virtually independent of the changing external ambient temperature. The hydrates 303, 309 are chosen to maintain the predetermined temperatures $T_1$, $T_2$. For example, gypsum, which gives up water of hydration near 80° C., is a hydrate that may be used to cool a portion of the atomic clock, for example the rubidium filled resonant chamber 305 and the photo-detector 307. For additional details regarding hydrates and their use in cooling systems, see U.S. Pat. No. 6,341,498 B1, "Downhole Sorption Cooling of Electronics in Wireline Logging and Monitoring While Drilling", and U.S. Patent Application Publication No. 20030085039 A1, "Downhole Sorption Cooling And Heating in Wireline Logging and Monitoring While Drilling", both of which are assigned to the assignee of the present application and both of which are incorporated herein by reference. Alternatively, phase change materials known in the art may be used alone or in conjunction with the other techniques described herein as a method of cooling the components of the atomic clock. Heaters (not shown) may be attached to the light source 304 and resonant chamber 305 to maintain operating temperatures when the external ambient temperatures are below the desired operating temperatures. Such heaters include, but are not limited to, (i) electric resistance heaters and (ii) sorption heaters, as described in the '039 published application, previously incorporated herein by reference. Those skilled in the art will appreciate that such heaters may not be mutually exclusive to the presence of the cooling devices.

In operation, the surface clock and the downhole clock are synchronized at the surface before the receiver is deployed in the wellbore. The surface clock is used to time stamp the record of the initiation of surface signals. The atomic clock has a stability of $2\times10^{-11}$ over 24 hours, which exceeds the stability requirement for a seismic survey by several orders of magnitude. The deployed downhole atomic clock maintains synchronization with the surface clock within 3 microseconds per day of continuous downhole deployment. The downhole clock is used to time-stamp the record of received signals stored in the downhole memory. When the receiver is retrieved at the surface, the received signal data is downloaded and correlated with the surface signal data according to the time stamps. The seismic profiles resulting from such a system have enhanced resolution and accuracy over systems using conventional downhole clocks because the atomic clock is highly stable and retains synchronization with the surface clock during the entire downhole deployment.

Figure 4:
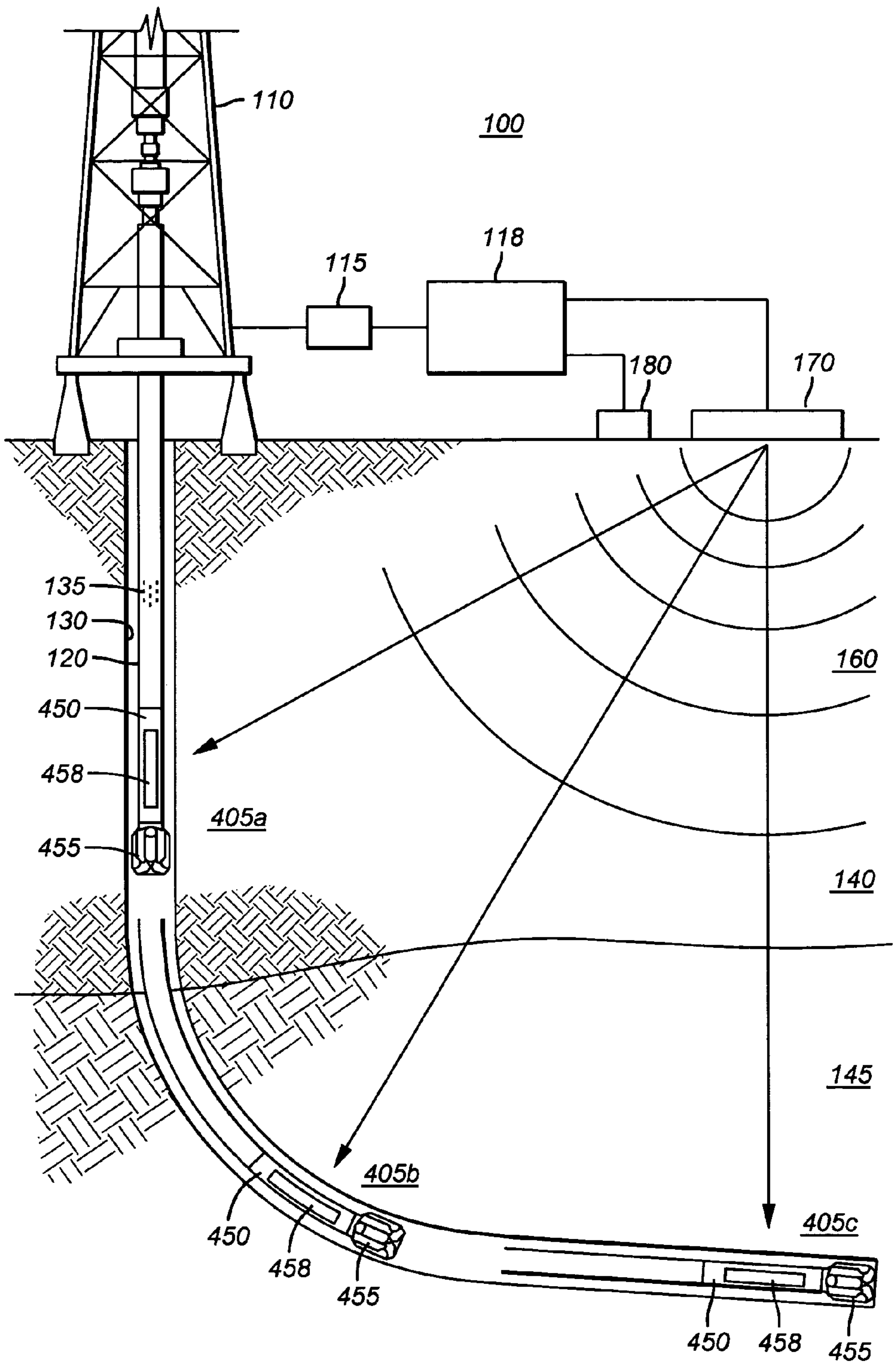
FIG. 4 is a schematic diagram of a seismic receiver deployed in a measurement while drilling (MWD) tool according to one embodiment of the present invention.

In one embodiment, described with reference to FIG. 4, a MWD tool 450 is attached between a drill string 120 and a bit 455. A seismic receiver 458 is integrated into the MWD tool 450. The seismic receiver 458 comprises a seismic sensor (not shown), such as a geophone, and an atomic clock (not shown) of the type and configuration previously described. The atomic clock may also be equipped with a heating and/or cooling system for maintaining the atomic clock at an acceptable operating temperature.

The receiver 458 receives the surface-generated seismic signals at multiple locations downhole, such as locations 405*a–c*. The seismic signals may be stored in memory downhole and retrieved from the system after the MWD tool 450 is tripped out of the wellbore. The atomic clock maintains synchronization with the surface clock.

Alternatively, MWD tool 450 may be deployed on the end of coiled tubing (not shown), using techniques known in the art. Similarly, MWD tool 450 may be employed on a wireline or similar logging deployment.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A system for acquiring geophysical data, comprising;

a. a controller for causing the generation of a signal, the controller having a first clock for time-stamping the generated signal; and b. a receiver deployed remotely from the controller detecting the signal; and c. an atomic clock proximate the receiver and synchronized with the first clock, wherein the receiver references the atomic clock to time-stamp the detected signal.

2. The system of claim 1 wherein the atomic clock has a drift rate of less than 3 microseconds per day.

3. The system of claim 1, wherein the atomic clock is based on an atomic transition of at least one of the set of: (i) rubidium, (ii) cesium and (iii) hydrogen.

4. The system of claim 1, wherein the atomic clock is based on an atomic transition of rubidium.

5. The system of claim 1, wherein the atomic clock is based on an atomic transition of an element chosen from Group 1 elements of the periodic table of elements.

6. The system of claim 1, wherein the signal is a seismic signal and the receiver is a seismic receiver.

7. The system of claim 1, wherein the receiver is deployed down a wellbore for receiving the signal.

8. The system of claim 7 wherein the receiver is adapted to be integrally mounted in a drill string for receiving the signal while drilling.

9. The system of claim 1 further comprising a thermal control system for maintaining a component of the atomic clock at a predetermined temperature.

10. The system of claim 9 wherein the thermal control system comprises a member chosen from the group consisting of: (i) a thermoelectric cooler; (ii) a sorption cooler; (iii) a sorption heater; (iv) a thermal isolator; (v) a resistance heater (vi) a phase change heater, and (vii) a phase change cooler.

11. The system of claim 9 wherein the thermal control system comprises a sorption system comprising a hydrate material in thermal communication with the component of the atomic clock.

12. The system of claim 9, wherein the component comprises a resonant chamber and a photo-detector.

13. The system of claim 9, wherein the component comprises a light source.

14. An atomic clock for use in a wellbore, comprising;

a. a downhole tool for housing the atomic clock b. a resonant chamber having a vapor therein;

c. a source for irradiating the vapor in the resonant chamber;

d. a detector in communication with the resonant chamber and adapted to receive energy from die resonant chamber; and e. a first thermal control device maintaining the resonant chamber and the detector at a first temperature range.

15. The atomic clock of claim 14 wherein the first thermal control device comprises a member chosen from the group consisting of (i) a thermoelectric cooler, (ii) a sorption cooler; (iii) a sorption heater; (iv) a thermal isolator; (v) a resistance heater; (vi) a phase change heater; and (vii) a phase change cooler.

16. The atomic clock of claim 14 wherein the first thermal control device comprises a sorption device comprising at least one hydrate.

17. The system of claim 14, wherein the source comprises a light source.

18. The system of claim 14, wherein the detector comprises a photo-detector.

19. The system of claim 14, wherein the atomic clock is based on an atomic transition of at least one of the set of: (i) rubidium, (ii) cesium and (iii) hydrogen.

20. The system of claim 14, wherein the atomic clock is based on an atomic transition of rubidium.

21. The system of claim 14, wherein the atomic clock is based on an atomic transition of an element chosen from Group 1 elements of the periodic table of elements.

22. The atomic clock of claim 14, further comprising a second thermal control device maintaining the source at a second predetermined temperature range.

23. The atomic clock of claim 22 wherein the second thermal control device comprises a member chosen from the group consisting of (i) a thermoelectric cooler; (ii) a sorption cooler; (iii) a sorption heater; (iv) a thermal isolator, (v) a resistance heater; (vi) a phase change heater; and (vii) a phase change cooler.

24. The atomic clock of claim 22 wherein the second thermal control device comprises a sorption device comprising at least one hydrate.

25. A method for acquiring geophysical data, comprising;

b. deploying the atomic clock in a wellbore;

c. transmitting energy into a formation surrounding the wellbore; and d. receiving a signal resulting from the energy and time-stamping the received signal using the atomic clock.

26. The method of claim 25 wherein the atomic clock has a drift rate of less than 3 microseconds per day.

27. The method of claim 25 wherein the atomic clock is based on an atomic transition of a member of the set of: (i) rubidium, (ii) cesium and (iii) hydrogen.

28. The method of claim 25 wherein the atomic clock is based on an atomic transition of rubidium.

29. The method of claim 25 further comprising receiving the signal while tripping out of the wellbore.

30. The method of claim 25 wherein the energy comprises seismic energy and the signal comprises a seismic signal.

31. The method of claim 25 further comprising receiving the signal while drilling the wellbore.

32. The method of claim 25 further comprising synchronizing a first clock with the atomic clock.

33. The method of claim 25 further comprising maintaining a component of the atomic clock at a predetermined temperature using a thermal control system.

34. The method of claim 33 wherein the thermal control system comprises one of the set of: (i) a thermoelectric cooler; (ii) a sorption cooler; (iii) a sorption heater; (iv) a thermal isolator; (v) a resistance heater; (vi) a phase change heater; and (vii) a phase change cooler.

35. The method of claim 33 wherein the thermal control system comprises a sorption device having a hydrate material in thermal communication with the component of the atomic clock.

* * * * *